March 10, 1925.
P. S. BAUER
1,528,964
COMBINED AUTOMATIC STEERING GEAR AND LOCK
Filed Aug. 18, 1921
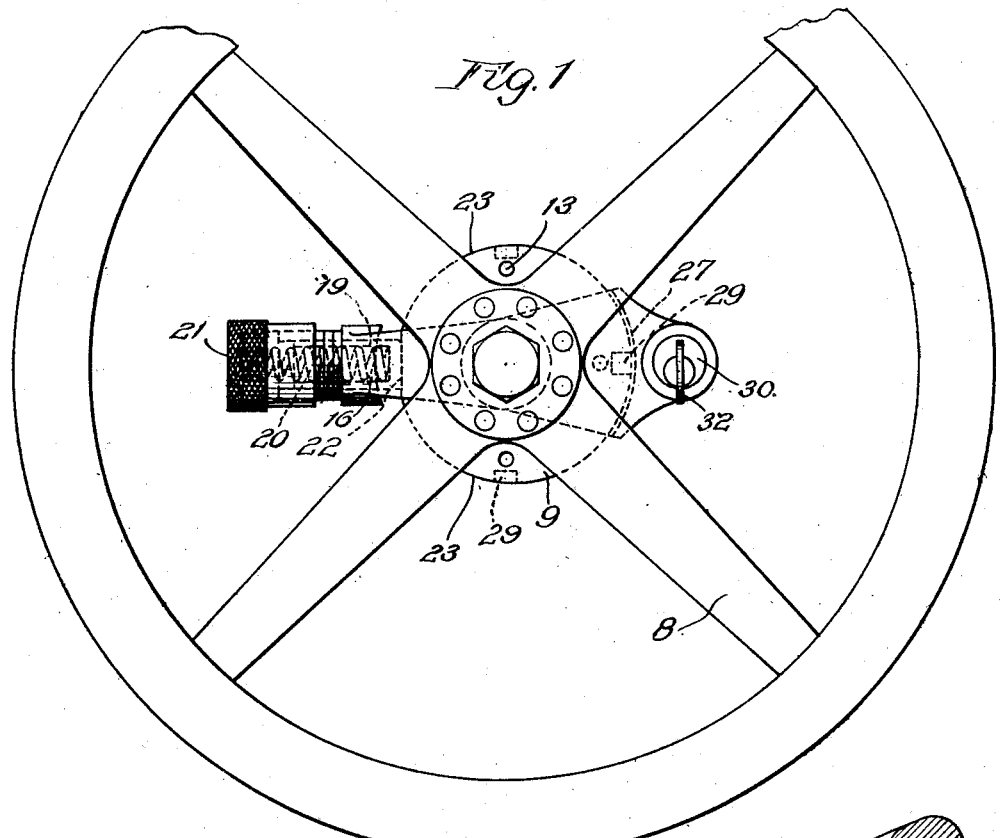
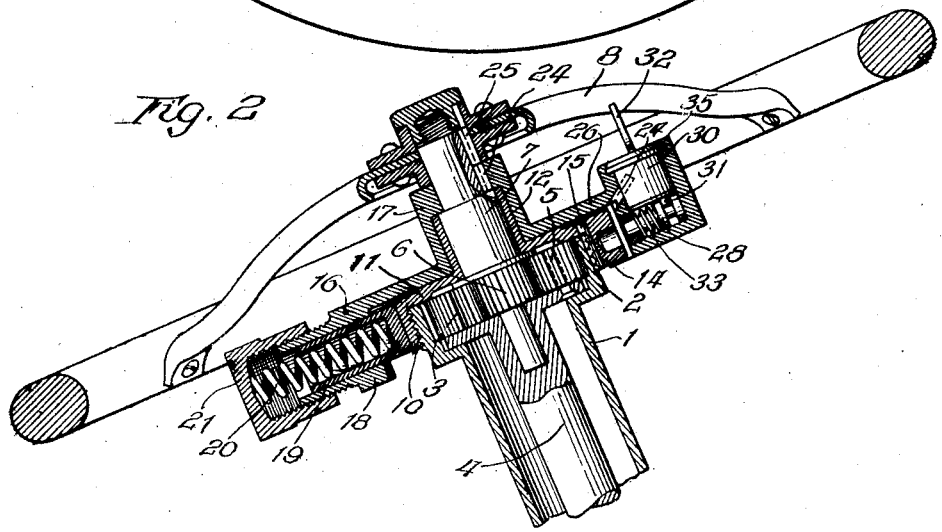
Inventor:
Perry S. Bauer
By Wm. O. Bell, Atty.

Patented Mar. 10, 1925.

1,528,964

UNITED STATES PATENT OFFICE.

PERRY S. BAUER, OF CHICAGO, ILLINOIS.

COMBINED AUTOMATIC STEERING GEAR AND LOCK.

Application filed August 18, 1921. Serial No. 493,235.

*To all whom it may concern:*

Be it known that I, PERRY S. BAUER, a citizen of the United States, residing at Chicago, in the county of Cook and State of Illinois, have invented certain new and useful Improvements in Combined Automatic Steering Gears and Locks, of which the following is a specification.

One object of this invention is to provide means to yieldingly hold the steering gear in position to guide the vehicle in a straight line and which will return the steering gear to this position when it has been operated either by the steering wheel or otherwise to turn the vehicle from a direct course.

Another object of the invention is to provide means for locking the steering gear against any steering movement.

A further object of the invention is to provide a combined steering gear and lock which will embody means to normally hold the steering gear in position to guide the vehicle in a direct course and permit the steering gear to be locked either in this position or in a position to direct it from a straight line.

I accomplish these objects by a construction one embodiment of which is illustrated in the accompanying drawing.

In the drawings—

Fig. 1 is a plan view with a portion of the steering wheel broken away and

Fig. 2 is a transverse section.

I have shown my device in a form applicable to a well known type of car in which the steering column 1 is provided at its upper end with a gear housing 2 in which suitable gearing 3 is mounted to provide the desired ratio between the steering wheel and the dirigible wheels of the vehicle. This type of vehicle usually embodies also a shaft 4 carrying at its upper end a series of planetary gears 5 meshing with a center gear 6 on a spindle 7 to which the steering wheel 8 is attached, and which spindle will be claimed as the steering shaft.

I remove the customary cover for the housing 2 and replace it with a cam 9 having threads 10 adapted to engage the threads of the steering column. As shown this cam is in the form of a cup 11 having a sleeve 12 extending upwardly from its central portion. I provide this cam with a series of passages 13 communicating with semicylindrical keyways 14 which lie adjacent to the periphery of the threads on the housing. To secure the cam against unscrewing I drive a hardened pin 15 through each of these passages and force it into the key way in the cam which necessitates its cutting a corresponding keyway in the threaded portion of the housing. Assembled above the cam 9 is a lever or plate 16 having a hub portion 17 adapted to telescope with the spindle 7 and the flange 12. This lever has at one end a tubular arm 18 in which is a reciprocating plunger 19 acted upon by a spring 20 compressed by cap 21, screwed on to the arm 18. The cap 21 may thus be adjusted to give the spring any desired compression. The surface of the cam is provided with a substantially flat seat 22 and on each side thereof a curved portion 23, which in this instance gradually increases in diameter from the seat to a point about 90° from the center of the seat. The customary key by which the steering wheel 8 is secured against rotation on the spindle 7 is replaced by a pair of keys 24, 25, the key 24 lying in corresponding key ways in the spindle 7 and hub 17 and the key 25 lying in corresponding keyways in the hub of the wheel 8 and the spindle 7.

With this construction and arrangement of parts the pressure of the spring 20 on the plunger 19 gives it a tendency to remain on the seat 22 or if removed therefrom to return to that seat; and this plunger being mounted on the arm 19 of the lever or plate 16 having its hub 17 keyed to the spindle 7, the steering gear is normally held in position to direct the vehicle in a straight line. In this particular make of automobile the curved portion of the cam extending over substantially a quarter of a circle provides the proper cam length to permit the vehicle to be cut either way to the limit of the steering gear and still have sufficient tendency under the action of the cam and the spring 20 to return to normal straight ahead position. It is to be understood however that in applying my device to other makes of automobiles the design of the cam will be made to suit the particular conditions and while I have described the seat as being flat it of course may take other forms suited to the particular needs.

To effect the desired locking of the steering gear I provide the lever or plate 16 with another arm 26 having a curved shoulder 27 adapted to lie against the surface of the cam opposite to the portions 22 and 23 and this shouldered portion is equipped with a bolt 28 adapted to seat in any one of the plurality of sockets 29 in the surface of the cam. As here shown these sockets are arranged at three points 90° apart. To operate the bolt 28 I provide a suitable lock 30 having an eccentric pin 31 suitably engaged with the bolt 28 so that upon operation of the lock by means of a key 32 the bolt may be moved into operative or inoperative position according to the operator's desire.

I have also equipped the bolt 28 with a spring 33 tending to hold it normally in inoperative position to prevent any possibility of the bolt jarring into locked position while the vehicle is in motion.

The lock 30 may be of any suitable form and I have merely illustrated the barrel secured in the shouldered portion of the arm 26 by a locking screw 34 and a burnished flange 35.

In placing the cam 9 on the housing 2 I locate the intermediate socket 29 in the proper position to receive the bolt 28 when the steering gear is adjusted to direct the vehicle in a straight line. By this arrangement it will be seen that the steering gear may be locked with the wheels cut to the extreme left or the extreme right or set straight ahead; and it will be noted that in each of these positions the lever arm 26 will cover one of the pins 13 so that it cannot be driven out of its seat in the cam and the housing 2. Also when the bolt 28 is located in one of the diametrically opposite sockets 29 the lever arm 18 will cover the pin 13 adjacent to the opposite socket 29. This makes it impossible to drive out the locking pins 13 and unscrew the cam from the hub. By making the keys 24 and 25 take the place of the customary key for the hub of the steering wheel and driving key 24 into place I make it impossible for the thief to remove the steering wheel, withdraw the key securing the spindle 7 to the lever or plate 16 then replace the wheel and drive the vehicle away.

It will be understood of course that in applying this lock to other types of vehicles the sockets 29 will be located suitably to the total movement of the steering wheel.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In combination, a steering column, a steering shaft, a cam mounted on said column, means to lock said cam to said column, a plate secured to said shaft, said plate overlying said cam and controlled thereby, means for locking said plate in a predetermined position, said plate covering said first named locking means when in such position.

2. In combination, a steering column, a steering shaft, a cam threaded on said column, means to lock said cam against rotation on said column, a plate secured to said shaft, said plate overlying said cam and controlled thereby, and means for locking said plate to said cam in a plurality of positions, said plate covering some of said first named locking means in any position in which it is locked.

PERRY S. BAUER.